United States Patent Office 2,761,775
Patented Sept. 4, 1956

2,761,775

PROCESS FOR DEFLUORINATING PHOSPHATE SOLUTIONS

Ira M. Le Baron, Evanston, Ill., assignor to International Minerals & Chemical Corporation, a corporation of New York No Drawing. Application September 27, 1952,
Serial No. 311,950

4 Claims. (Cl. 71—42)

This invention relates to a process of producing phosphate material for use as, or in, plant and animal foods. More particularly it relates to a novel process for the production of a defluorinated phosphatic material. Still more particularly it relates to a new and novel process for the recovery of high percentages of defluorinated phosphate from phosphatic solutions in the form of mono and dicalcium phosphate or mixture thereof.

Various grades of so-called superphosphates are produced. A process in general use prepares high grade superphosphate by reacting a ground phosphate rock with sulfuric acid. The product contains no more than about 20% by weight of available $P_2O_5$ of which about 90 to 95% is present in water soluble condition. Another process for the production of a high grade phosphate of commerce involves the acidifying of ground phosphate rock with orthophosphoric acid. This process produces a product ordinarily containing about 47% by weight of $P_2O_5$ of which about 90% is available and about 95% of the total available is water soluble. The terms "water soluble" and "available," as used herein, have a connotation as specified and defined by the Association of Official Agricultural Chemists with reference to the phosphorus content of phosphatic components of fertilizers.

A serious drawback of these processes is the quantities of fluorine present therein. Phosphate-bearing rock of the so-called low grade contains, after beneficiation, approximately 30 to 35% $P_2O_5$ with a fluorine content of approximately 3.0 to 4.0, only about 20 to 30% of which is eliminated by these methods. Inasmuch as recoveries heretofore have generally been less than 90% and the water soluble content thereof about 95%, particularly where sulfuric acid was utilized, the processes have given products of undesirable fluoride solubility from an efficient plant utilization standpoint and too high in fluorine content for animal feed.

It is an object of this invention to overcome the disadvantages and shortcomings of processes heretofore in use.

It is an object of this invention to produce a granular, non-hydroscopic, free flowing phosphate material of low fluorine content.

It is another object of this invention to provide a relatively inexpensive process utilizing sulfuric acid for reaction with phosphatic rock components whereby the leach solutions containing soluble phosphates are rendered lower in fluorine content within reasonable operating periods than processes utilized heretofore.

It is a further object of this invention to provide a method for complete defluorination of solutions obtained by the leaching of superphosphates.

It is still a further object of this invention to provide an improved mode of operation whereby limestones of special character may be utilized in commercial scale defluorination operations.

These and other objects of the invention will be apparent from the following description.

Briefly, the improved method of this invention comprises admixing with a phosphatic solution, particularly those solutions obtained by extraction with an aqueous medium of a superphosphate prepared by mixing phosphate rock and sulfuric acid, an allochthonous limestone of the calcarenite type and removing the solid phase constituents from the resultant slurry.

When utilizing this defluorination step as a portion of a process for the preparation of, for example a relatively fluorine free dicalcium phosphate, the superphosphate is prepared by grinding phosphate rock and mixing the comminuted rock with sulfuric acid to produce an acid mix generally containing sulfuric acid in molar excess of up to about 10% over that required to form mono calcium phosphate and to react with the impurities present. This acid mix is leached with an aqueous medium to produce a leach solution containing the soluble mono calcium phosphate and free phosphoric acid. Insoluble rock and gypsum and the like are separated from the solution which is then subjected to the defluorination step. In this purifying step the filtered solution is mixed with a porous fine-grained limestone often having a chalk-like character. The undissolved limestone and precipitated solids are separated from the slurry by suitable means to recover a filtrate of relatively high phosphorus to fluorine ratio. This filtrate is mixed with quantities of calcium-bearing materials sufficient to precipitate the $P_2O_5$ content as predominantly dicalcium phosphate with only minor amounts of mono and tricalcium phosphate being formed.

More in detail, the improved process reacts finely divided phosphate rock with sulfuric acid of predetermined dilution. A phosphatic rock material comprises essentially tricalcium phosphate or its mineral equivalent; for example, collophane or apatite of either high or low phosphatic content, which content usually falls in the range of approximately 30% to approximately 35% $P_2O_5$. If the source of phosphatic material is Florida pebble, the fluorine content of the rock will fall usually in the range of approximately 3.0 to about 4.0%. The phosphatic source material is best utilized after it is finely ground, i. e., about 48% to about 80% being capable of passing through a 200 mesh standard screen. Less finely ground material may be used, but the subsequent acidulation requires considerably longer time to achieve substantially as complete conversion. The finely ground material is reacted with sulfuric acid under intensive agitation which is of short duration.

The time of mixing is preferably of the order of 1 to 10 minutes, which time is sufficient for thorough mixing and at the same time results in the formation of a porous, easily crushed mass of low bulk density. The temperature of the acid fed to the mixer is generally within the range of about 50° C. to about 100° C.

The sulfuric acid mixed with finely ground rock may be of any convenient dilution; for example, about 50% to about 70% sulfuric acid corresponding to 40° to about 55° Bé. It will, of course, be understood that under special conditions concentrations of sulfuric acid higher than those mentioned may be utilized. This acid is added to the ground phosphate rock in such a proportion that there will be present in the mix between about 101% and about 110% of the sulfuric acid theoretically required to convert all of the $P_2O_5$ present in the rock to mono calcium phosphate, allowing, in addition, enough acid to also react with such impurities as iron, alumina and fluorine.

Acid is preferably added as about 60% to about 69% sulfuric acid. The total quantity of acid need not be added all at the same time as a single addition, but may be partially added originally and the remainder added during or before the subsequent leaching step. Those familiar with the sulfuric acid process will at once recognize that this process is more economical because it utilizes less concentrated acid and smaller amounts of excess acid for the highest recovery of $P_2O_5$ components from the rock. The highest recovery of water soluble phosphorus values is achieved using about 65% to about 69% sulfuric acid. A maximum recovery is generally obtained using about 66% sulfuric acid with the mix being aged for about two weeks. The acid mix has been found to set up in about 15 to 20 minutes into a dry mass which remains friable for indefinite periods of time. This acid mix, as initially formed, should constitute about 65% solids but may range between about 45% and about 70% solids. The solidified mix may be conveyed directly to succeeding process steps or it may simply be stored until such time as required.

The acid mix is next subjected to a leaching and then a filtration operation. The acid mix is passed through suitable pulverizing apparatus, such as a hammer mill, and the powdered product fed to a mixing tank in predetermined quantities where it is mixed with metered quantities of water or dilute aqueous mono calcium phosphate solution. The leaching operation may be carried out at elevated temperatures, usually in the range of about 72° C. to about 82° C., in order to reduce the viscosity of the solution and improve filtration provided the mol ratio of $CaO/P_2O_5$ is maintained below a point at which there will be formation of insoluble dicalcium phosphate precipitates. The leaching operation is preferably carried out by the countercurrent flow of solids and liquids. Sufficient liquid leaching medium is added so that the resulting slurry contains between about 35% and about 40% solids, although slurries of concentrations outside this range may be employed if desired. The agitation and slurrying is for a short period, of the order of about 5 to 15 minutes, with higher heat or at atmospheric temperatures.

In the countercurrent operation the aqueous medium first contacts solids which have passed through successive mixing stages and liquid-solid separations to the last mixing stage. Rich liquor from the first liquid-solid separation or filter stage contains approximately 30% to approximately 35% dissolved solids of which approximately 18% to 22% is phosphate measured as $P_2O_5$ values and approximately 0.2% to approximately 0.7% is fluorine. This solution is of about 31° to approximately 34° Bé. The separation of phosphatic solution and insoluble solids may be carried out in any convenient and conventional manner such as, for example by filtration, countercurrent multistage centrifuging or by use of liquid phase cyclone separators.

The phosphate solution recovered from the liquid-solids separation is an aqueous solution of approximately 20% to approximately 33% by weight solids content. This solution comprises essentially mono calcium phosphate and orthophosphoric acid with fluorine as the primary contaminant affecting its use in animal foods.

When this phosphate solution is to be defluorinated it is mixed with the solution about 3 to about 8 parts by weight of a porous calcarenite-type limestone having a low bulk density. The slurry is maintained at a temperature in the range of about 40° C. to about 65° C. and the slurry agitated for a period in the range between about 30 minutes and about 90 minutes. During this mixing period an appreciable quantity, but not all of the calcium carbonate, usually is dissolved and the bulk of the fluorine is thrown out of solution as a solid phase material showing the presence of fluorine, phosphorus and calcium. Upon removal of this solid phase the solution usually is found to contain fluorine in quantities of the order of .1% to about .04%, which fluorine content is so low that upon production of a solid calcium phosphate material from the solution the material is useful as an animal food or for other purposes in which fluorine would have deleterious effects.

The invention will be more fully understood from the following description which is given by way of explanation and not with any intention of limiting the invention to the specific conditions set forth.

About 10 tons per hour of Florida phosphate rock was ground to a particle size approximately 52% of which passed through a 200 mesh standard screen. This rock analyzed about 67% bone phosphate of lime. The ground rock was mixed with about 6 tons per hour of about 98% sulfuric acid added as approximately 54° Bé. aqueous solution. The mixture was thoroughly agitated for about 5 minutes after which it was discharged onto a continuous belt provided with exhaust means for gases such as sulfur dioxide, silicon tetrafluoride and the like, adjacent the point of discharge of slurry onto the belt. The belt length and its speed were such that the mixture remained on the belt about 20 minutes. The discharge from the belt was stored in a pile for about 14 days.

The stored material was then removed from storage, broken up and sufficient water added to give a slurry of about 35% undissolved solids. The slurry was subjected to 4 stages of continuous countercurrent decantation followed by a final filtration to produce a leach solution containing about 30% dissolved solids and being of about approximately 32° Bé. gravity. This leach solution was divided into 6 equal portions, portion A was retained as a control sample and contained approximately 12.3% $P_2O_5$, approximately .31% fluorine and had a mole ratio of $CaO/P_2O_5$ of approximately .62.

To 100 parts by weight of leach solution samples, B, C, D, E and F, were added 6 parts by weight of the following limestones, each ground to —100 mesh size, namely, Ocala, Florida, Key Largo, Florida; Bedford, Indiana; and Buffalo, New York, respectively. Each of the slurries was maintained at approximately 55° C. After 45 minutes reaction time the solid phase material was separated from each mixture. The filtrates were analyzed to determine the P/F ratio as follows:

The solution was analyzed for $P_2O_5$ content by the method utilized by the Association of Phosphate Mining Chemists. In this method aqua regia is added to this solution and a precipitate formed by the addition thereto of a mixture of ammonium nitrate and ammonium molybdate. After about 20 minutes stirring the slurry is filtered and the filtrate titrated with standard NaOH and then back-titrated with nitric acid.

The fluorine content was determined by the modified method of Willard and Winter. In this method solution is distilled with phosphoric acid, the distillate is neutralized with NaOH and HCl using para nitro phenol as indicator. After neutralization, sodium chloride is added and acid solution alizarin red added as indicator. The latter solution is then titrated with thorium nitrate. Results were as follows:

| Origin | Mesh Size | Description | P/F of Extract |
| --- | --- | --- | --- |
| Ocala, Fla. | —100 | Soft, porous limestone | 174 |
| Key Largo, Fla. | —100 | Porous, crystalline coral limestone. | 136 |
| Bedford, Ind. | —100 | Porous, crystalline oolitic limestone. | 125 |
| Buffalo, N. Y. | —100 | Dense, fine-grained to medium-grained, crystalline limestone. | 97 |

From the above data it will be seen that the so-called Ocala limestone, which is of the porous, chalky, low bulk density calcarenite-type, gives a markedly superior defluorination of phosphate solutions for equal period of time of reaction.

Phosphate constituents may be recovered from such a low fluorine content liquor in various ways. The solution can be evaporated, for example in vacuum evaporators and the concentrate spray dried or the solution can be reduced to substantial dryness with or without maintaining a circulating or recycle load of granular material in a rotary kiln. Preferably, however, the phosphatic constituents of the solution are precipitated by the addition of calcium-bearing reactants. The precipitated solids are recovered by suitable liquid-solids separation means and dried.

Having thus fully described and illustrated the character of the invention what is desired to be secured by Letters Patent is:

1. The method of defluorinating phosphatic solutions containing fluorine and at least about 12.3% $P_2O_5$ content by weight which comprises reacting with said solution a porous calcarenite-type limestone, there being employed for each 100 parts by weight of said solution from about 3 to about 8 parts by weight of said limestone to produce a fluorine-rich precipitate and a mother liquor from which the phosphate constituents can be recovered as dicalcium phosphate having a fluorine content of less than 0.1% by weight, and separating said precipitate from said mother liquor.

2. The method of claim 1 wherein the phosphatic solution which is defluorinated is prepared by leaching a superphosphate with an aqueous medium.

3. The method of claim 2 wherein the phosphatic solution obtained by leaching a superphosphate has a $CaO/P_2O_5$ mole ratio in the range of approximately 0.4 to approximately 0.75; a dissolved solids content of between about 20% and about 40% by weight, and a $P_2O_5$ content of between about 12.3% and about 22.0% by weight.

4. In a process for the defluorination of fluorine containing phosphatic solutions having at least about 12.3% $P_2O_5$ content by weight by the reaction of inorganic basic calcium compounds therewith in an amount requisite to form a precipitate containing substantially all of the fluorine and a minimum amount of the phosphorous values present to produce a product having a fluorine content of less than 0.1% by weight, the step comprising employing as the inorganic basic calcium compound a porous calcarenite-type limestone.

References Cited in the file of this patent

UNITED STATES PATENTS

| | | |
|---|---|---|
| 1,348,495 | James | Aug. 3, 1920 |
| 1,425,747 | Coates | Aug. 15, 1922 |
| 1,826,785 | Holz | Oct. 13, 1931 |
| 2,013,970 | Moore | Sept. 10, 1935 |
| 2,115,150 | Seyfried | Apr. 26, 1938 |
| 2,312,047 | Ogburn | Feb. 23, 1943 |
| 2,417,462 | Adler | Mar. 18, 1947 |